(12) United States Patent
Inazu et al.

(10) Patent No.: US 9,703,735 B2
(45) Date of Patent: Jul. 11, 2017

(54) DATA COMMUNICATION SYSTEM, SLAVE, AND MASTER

(71) Applicant: DENSO CORPORATION, Kariya, Aichi-pref. (JP)

(72) Inventors: Kenji Inazu, Toyota (JP); Hironobu Akita, Okazaki (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 14/309,249

(22) Filed: Jun. 19, 2014

(65) Prior Publication Data
US 2014/0379949 A1 Dec. 25, 2014

(30) Foreign Application Priority Data
Jun. 24, 2013 (JP) ................................. 2013-131711

(51) Int. Cl.
| G06F 3/14 | (2006.01) |
|---|---|
| G06F 13/36 | (2006.01) |
| G06F 13/362 | (2006.01) |
| G06F 1/10 | (2006.01) |
| H04L 5/14 | (2006.01) |
| H04L 1/20 | (2006.01) |

(52) U.S. Cl.
CPC ............ *G06F 13/362* (2013.01); *G06F 1/10* (2013.01); *H04L 1/205* (2013.01); *H04L 5/1423* (2013.01)

(58) Field of Classification Search
CPC . G06F 3/14; G06F 3/147; G06F 13/36; H04L 5/1423; H04L 1/205
See application file for complete search history.

(56) References Cited

U.S. PATENT DOCUMENTS

| 3,993,867 A | 11/1976 | Blood, Jr. |
|---|---|---|
| RE30,111 E | 10/1979 | Blood, Jr. |

(Continued)

FOREIGN PATENT DOCUMENTS

| JP | H02-272838 A | 11/1990 |
|---|---|---|
| JP | H04-318711 A | 11/1992 |

(Continued)

OTHER PUBLICATIONS

Office Action mailed Apr. 14, 2015 issued in corresponding JP patent application No. 2013-131711 (and English translation).

(Continued)

*Primary Examiner* — Henry Tsai
*Assistant Examiner* — Christopher A Daley
(74) *Attorney, Agent, or Firm* — Posz Law Group, PLC

(57) ABSTRACT

A data communication system includes a master and a slave. The master transmits a first subject signal including a first subject data to the slave via a transmission line. The slave extracts a clock signal from the first subject signal by performing a clock data recovery process and determines the first subject data based on the first subject signal. The slave transmits a second subject signal including a second subject data to the master during an existing period of the first subject signal without interfering an extracting of the clock signal and a determination of the first subject data. The master receives the second subject signal and cancels a waveform component of the first subject signal from a waveform of the second subject signal, and then determines the second subject data based on the second subject signal.

12 Claims, 11 Drawing Sheets

(56) References Cited

U.S. PATENT DOCUMENTS

| | | | |
|---|---|---|---|
| 7,158,593 B2* | 1/2007 | Kim | H04L 5/06 375/354 |
| 8,958,497 B2* | 2/2015 | Lee | H04B 7/015 375/285 |
| 9,490,965 B2* | 11/2016 | Lee | H04B 7/015 |
| 2002/0018492 A1 | 2/2002 | Sakai et al. | |
| 2004/0247022 A1* | 12/2004 | Raghavan | H04B 3/32 375/219 |
| 2006/0227916 A1 | 10/2006 | Masui et al. | |
| 2011/0164693 A1 | 7/2011 | Komatsu et al. | |
| 2012/0281603 A1 | 11/2012 | Takatori | |

FOREIGN PATENT DOCUMENTS

| | | |
|---|---|---|
| JP | 2001-086185 A | 3/2001 |
| JP | 2005-269261 A | 9/2005 |
| JP | 2006-109082 A | 4/2006 |
| JP | 2006-166229 A | 6/2006 |
| JP | 2007-251861 A | 9/2007 |
| JP | 2009-077134 A | 4/2009 |
| JP | 2009-219021 A | 9/2009 |

OTHER PUBLICATIONS

Frank Sjoberg et al., "Zipper: A Duplex Method for VDSL Based on DMT", IEEE Transactions on Communications, vol. 47, No. 8, Aug. 1999, pp. 1245-1252.

Tai-Cheng Lee et al., "A 125-MHz Mixed-Signal Echo Canceller for Gigabit Ethernet on Copper Wire", IEEE Journal of Solid-State Circuits, vol. 36, No. 3, Mar. 2001, pp. 366-373.

* cited by examiner

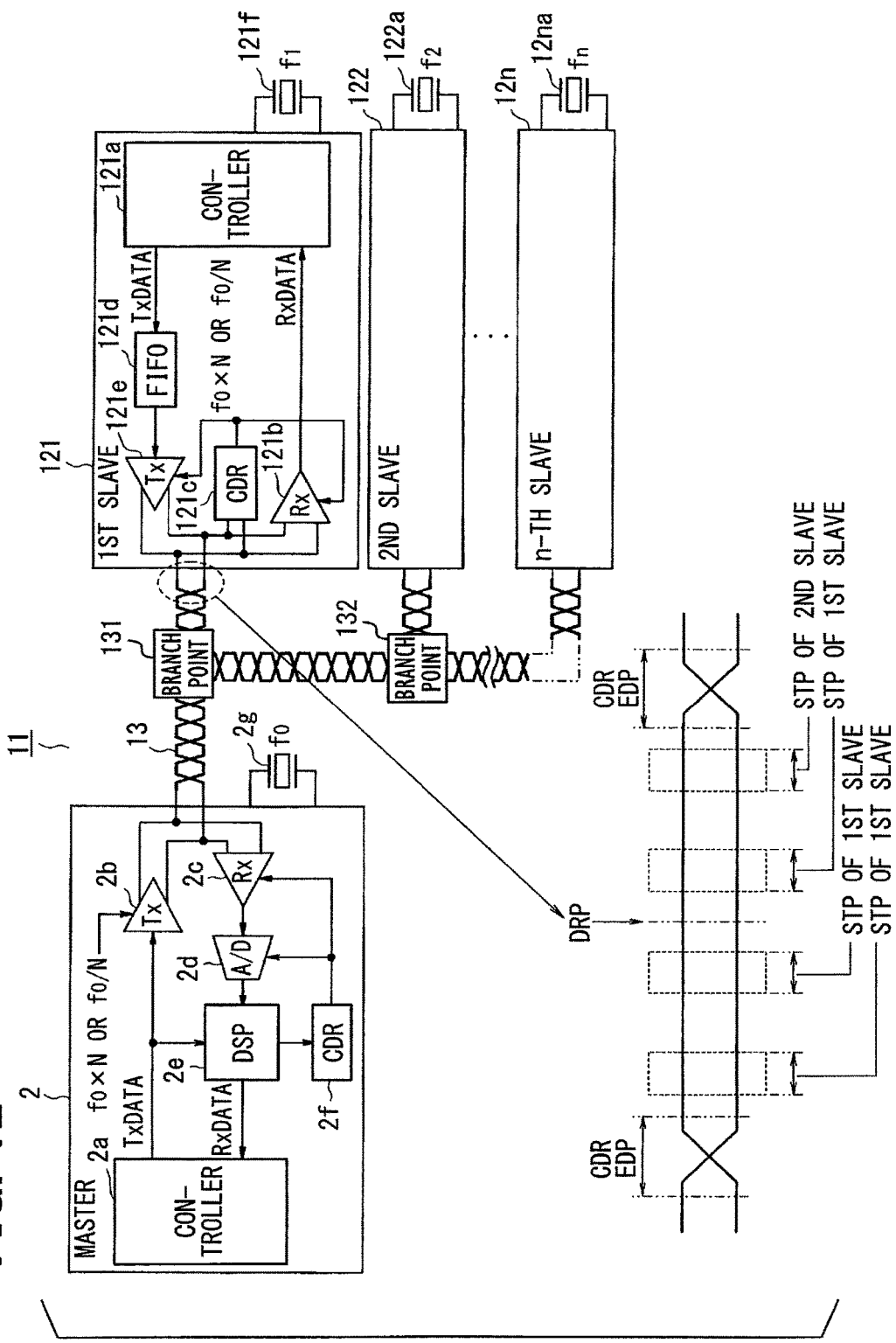

DATA COMMUNICATION SYSTEM, SLAVE, AND MASTER

CROSS REFERENCE TO RELATED APPLICATION

This application is based on Japanese Patent Application No, 2013431711 filed on Jun. 24, 2013, the disclosure of which is incorporated herein by reference.

TECHNICAL FIELD

The present disclosure relates to a data communication system that performs a duplex data communication using single transmission line, and a slave and a master utilized in the data communication system.

BACKGROUND

In a data communication system equipped to a vehicle, a duplex data communication is required to be performed using single wire harness or two paired wire harnesses for differential signaling so that total weight of the wire harnesses is reduced. When the data communication is performed between an electronic control unit (ECU) and a sensor (or an actuator), an increase in cost is required to be restricted in the sensor or the actuator. In an application that does not require a high-speed data communication rate, a wire harness may be used as a transmission line that performs duplex data communication. Herein, the transmission line may perform the duplex data communication based on a time division multiplexing that is used in distributed system interface 3 (DSI3) or in peripheral sensor interface 5 (PSI5). However, in an application that requires a high-speed data communication rate, the time division multiplexing may cause a deterioration in transmission efficiency.

On the other hand, when the data communication is performed simultaneously in bidirectional without performing the time division multiplexing, signal interference occurs and received data cannot be reproduced from the received signal waveforms. Usually, a clock data recovery (CDR) process that extracts a clock signal from a received signal is used to synchronize a communication rate. However, a transmission signal affects a signal waveform of itself, and the clock signal extracted by the clock data recovery has a relatively large amount of error. Regarding above-described difficulties, duplex data communication using single wire harness without performing time division multiplexing may be performed in the following two methods.

The first method is dividing a communication signal frequency. As shown in Fig. 5 of "IEEE TRANSACTIONS ON COMMUNICATIONS, VOL. 47, NO. 8, AUGUST 1999 Zipper: A Duplex Method for VDSL Based on DMT", a bandwidth of a digital subscriber line (DSL) may be divided in order to perform the duplex data communication using single wire harness. The second method is subtracting the transmission signal of own device from the received signal that is transmitted from a different device. As shown in Fig. 3 of "IEEE JOURNAL OF SOLID-STATE CIRCUITS, VOL. 36, NO. 3, MARCH 2001 A 125-MHz Mixed-Signal Echo Canceller for Gigabit Ethernet (registered trademark) on Copper Wire", a digital processor cancels a transmission data and an echo component of the transmission data from a received data by performing a signal processing in order to perform the duplex data communication using single wire harness.

However, in the first method, a modulation and demodulation circuit for frequency conversion is additionally required, and accordingly, a circuit structure becomes complicated compared with a normal case in which the modulation and demodulation of the frequency is not required. In addition, the complicated circuit structure causes increase in cost. In the second method, an analog-digital converting circuit, a digital-analog converting circuit, and a digital signal processing circuit are additionally required, and accordingly, a circuit structure becomes complicated compared with a normal case in which above-described circuits are not required. In addition, the complicated circuit structure causes increase in cost. As described above, the duplex data communication can be performed using single wire harness with either one of the above-described two methods. However, additional circuits are required in each of the two methods, and the additional circuits required to be added cause increase in cost.

SUMMARY

In view of the foregoing difficulties, it is an object of the present disclosure to provide a data communication system in which a duplex data communication using single transmission line is performed at low cost with a simplified circuit structure, and it is also a subject of the present disclosure to provide a master and a slave utilized in the data communication system.

According to a first aspect of the present disclosure, a data communication system includes a master and a slave. The master transmits, to the slave, a first subject signal including a first subject data via a transmission line. The slave extracts a clock signal from the first subject signal by performing a clock data recovery process and determines the first subject data based on the first subject signal. The slave transmits a second subject signal including a second subject data to the master via the transmission line during an existing period of the first subject signal. The slave transmits the second subject signal without interfering an extracting of the clock signal and a determination of the first subject data. The master receives the second subject signal transmitted from the slave via the transmission line and cancels, from a waveform of the second subject signal, a waveform component of the first subject signal and an echo component of the first subject signal, and then determines the second subject data based on the second subject signal.

With the above data communication system, between the master and the slave, a duplex data communication using single transmission line is performed at low cost with a simplified circuit structure.

According to a second aspect of the present disclosure, a slave includes a receiving circuit, a clock extraction circuit, a data determination unit, and a transmission circuit. The slave configures a data communication system together with a master that transmits a first subject signal including a first subject data to the slave via a transmission line. The receiving circuit receives, from the master, the first subject signal via the transmission line. The clock extraction circuit extracts a clock signal from the first subject signal by performing a clock data recovery process. The data determination unit determines the first subject data based on the first subject signal. The transmission circuit transmits a second subject signal including a second subject data to the master via the transmission line during an existing period of the first subject signal. The slave transmits the second subject signal without interfering an extracting of the clock signal and a determination of the first subject data.

With the above slave, between the master and the slave, a duplex data communication using single transmission line is performed at low cost with a simplified circuit structure.

According to a third aspect of the present disclosure, a master includes a receiving circuit, a cancelling unit, and a data determination unit. The master configures a data communication system with a slave that receives a first subject signal transmitted from the master via a transmission line. The first subject signal includes a first subject data. The slave extracts a clock signal from the first subject signal by performing a clock data recovery process and determines the first subject data based on the first subject signal. The receiving circuit receives a second subject signal transmitted from the slave via the transmission line. The second subject signal includes a second subject data. The cancelling unit cancels, from a waveform of the second subject signal, a waveform component of the first subject signal and an echo component of the first subject signal. The data determination unit determines the second subject data based on the waveform of the second subject signal from which the waveform component of the first subject signal and the echo component of the first subject signal is cancelled.

With the above master, between the master and the slave, a duplex data communication, using single transmission line is performed at low cost with a simplified circuit structure.

BRIEF DESCRIPTION OF THE DRAWINGS

The above and other subjects, features and advantages of the present disclosure will become more apparent from the following detailed description made with reference to the accompanying drawings. In the drawings:

FIG. 12 is a diagram showing transmission periods assigned to multiple slaves in a data communication system according to a fifth embodiment.

DETAILED DESCRIPTION

First Embodiment

Figure 1:
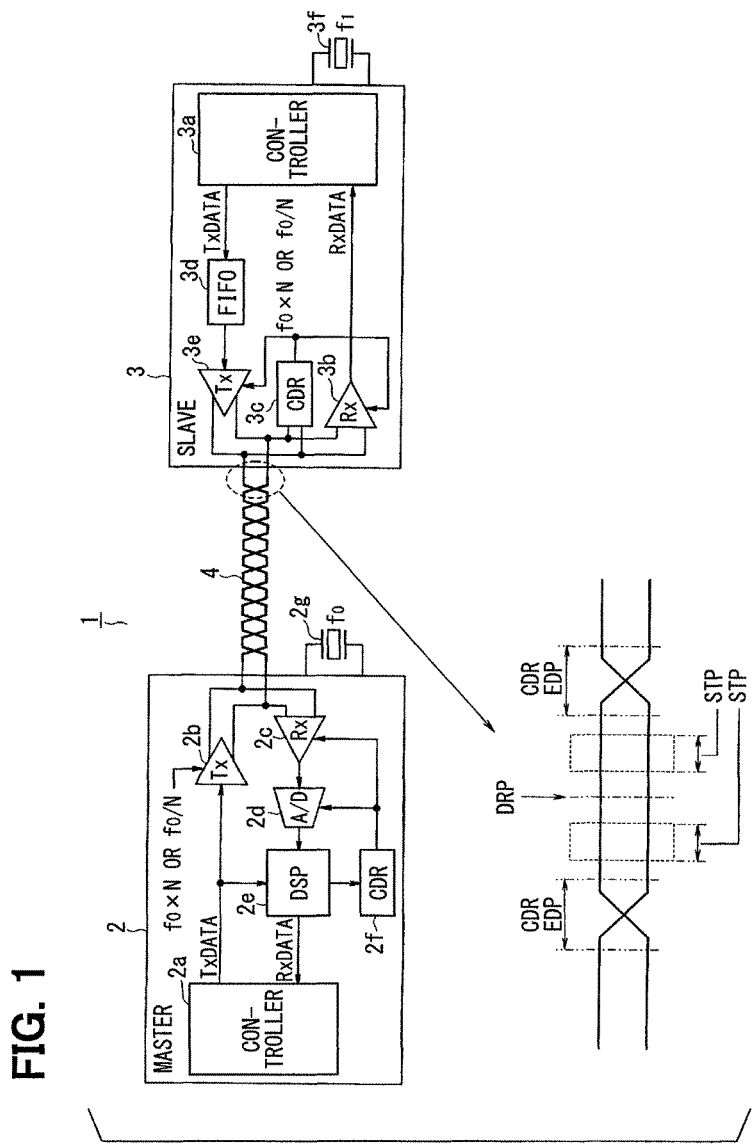
FIG. 1 is a diagram showing a configuration of a data communication system according to a first embodiment of the present disclosure.

The following will describe a data communication system according to a first embodiment of the present disclosure with reference to FIG. 1 to FIG. 4.

The data communication system 1 is applied to a vehicle, and includes a master 2, a slave 3, and a wire harness 4. The wire harness 4 functions as a transmission line. The wire harness is also referred to as a bus. The master 2 is connected with the slave 3 via the wire harness 4 in point-to-point relation. The master 2 may be provided by an integrated circuit (IC) included in an electronic control unit (ECU). The slave 3 may be provided by an IC included in a sensor, an actuator or the like. For example, the master 2 may be equipped to the ECU and the slave 3 may be equipped to the sensor, and the ECU may receive a sensing signal from the sensor and perform a predetermined operation. For another example, the master 2 may be equipped to the ECU and the slave 3 may be equipped to the actuator, and the ECU may transmit a driving signal to the actuator in order to drive the actuator. In a case where the master 2 is equipped to the ECU, the master may have a high current consumption and large chip size. In a case where the slave 3 is equipped to the sensor or the actuator, the slave is preferably required to have a low current consumption and a small chip size. The wire harness 4 may be provided by a twisted pair cable, a flat cable, a coaxial cable, or a twin-axial cable.

The master 2 includes a controller 2a, a transmission circuit 2b, a receiving circuit 2c, an analog-digital converting circuit 2d, a digital signal processor (DSP) 2e, and a clock extraction circuit 2f. The controller 2a functions as a data determination unit, and the digital signal processor 2e functions as a cancelling unit. The master 2 is connected with an external oscillator 2g. The external oscillator 2g may be provided by, for example, a crystal oscillator or a ceramic oscillator. For example, the external oscillator 2g provides, to the master 2, a clock signal having a higher accuracy than a clock signal generated by an oscillator, such as a resistor-capacitor oscillator that does not include an oscillation element. The clock signal provided by the external oscillator 2g to the master 2 has a first oscillation frequency f0. The controller 2a, the transmission circuit 2b, the receiving circuit 2c, the analog-digital converting circuit 2d, the DSP 2e, and the clock extraction circuit 2f operate based on the clock signal having the first frequency f0 provided by the external oscillator 2g. The controller 2a, the transmission circuit 2b, the receiving circuit 2c, the analog-digital converting circuit 2d, the DSP 2e, and the clock extraction circuit 2f may also operate based on a multiplied clock signal having a frequency of f0xN or f0/N generated by the external oscillator 2g using a phase locked loop.

The slave 3 includes a controller 3a, a receiving circuit 3b, a clock extraction circuit 3c, a first in first out (FIFO) 3d, and a transmission circuit 3e. The controller 3a functions as a data determination unit. The slave 3 is connected with an external oscillator 3f. Similar to the external oscillator 2g that is connected with the master 2, the external oscillator 3f may be provided by, for example, a crystal oscillator or a ceramic oscillator. For example, the external oscillator 3f provides, to the slave 3, a clock signal having a higher accuracy than a clock signal generated by an oscillator, such as a resistor-capacitor oscillator that does not include an oscillation element. The clock signal provided by the external oscillator 3f has a second oscillation frequency f1. In the slave 3 according to the present embodiment, an accuracy of the clock signal can be further corrected by a clock data recovery, which will be described later. Thus, instead of the external oscillator 3f, the slave 3 may include an internal oscillator (not shown), which is embedded in the slave 3 and is provided by a resistor-capacitor oscillator having a low accuracy. The controller 3a, the receiving circuit 3b, the clock extraction circuit 3c, the FIFO 3d, and the transmission circuit 3e operate based on the clock signal provided by the external oscillator 3f. The controller 3a, the receiving circuit 3b, the clock extraction circuit 3c, the FIFO 3d, and the transmission circuit 3e may also operate based on a multiplied clock signal generated by the external oscillator 3f using a phase locked loop.

The following will describe a data transmission from the master 2 to the slave 3 in the data communication system 1 having above-described configuration. In the master 2, when the controller 2a outputs a subject data to the transmission circuit 2b, the transmission circuit 2b encodes the subject data, and generates a subject signal to include the subject data. The subject data transmitted from the master 2 is also referred to as a transmission data (TxDATA) of the master 2, and the subject signal transmitted from the master 2 is also referred to as a transmission signal (TxSIG) of the master 2. Then, the transmission circuit 2b transmits the subject signal to the slave 3 via the wire harness 4 based on the clock signal or the multiplied clock signal provided by the external oscillator 2g.

In the slave 3, the receiving circuit 3b and the clock extraction circuit 3c receive the subject signal transmitted from the transmission circuit 2b of the master 2 via the wire harness 4. The subject signal received by the slave 3 is also referred to as a received signal (RxSIG) of the slave 3, and the subject data included in the subject signal received by the slave 3 is also referred to as a received data (RxDATA) of the slave 3. The clock extraction circuit 3c of the slave 3 extracts, from the subject signal, a clock signal that is synchronized with the subject signal by performing the clock data recovery. The clock extraction circuit 3c outputs, to the receiving circuit 3b, the extracted clock signal that is synchronized with the subject signal. The receiving circuit 3b of the slave 3 receives the subject signal transmitted from the master 2 based on the clock signal output from the clock extraction circuit 3c of the slave 3. Then, the receiving circuit 3b decodes the subject signal, and outputs the subject signal that is decoded to the controller 3a. When the controller 3a receives the decoded subject signal from the receiving circuit 3b, the controller 3a extracts the subject data included in the decoded subject signal, and determines whether the subject data is equal to "0" or "1". That is, the controller 3a of the slave 3 reproduces the subject data transmitted from the master 2.

The following will describe a data transmission from the slave 3 to the master 2 in the data communication system 1 having above-described configuration. In the slave 3, when the controller 3a outputs a subject data to the transmission circuit 3e via the FIFO 3d, the transmission circuit 3e encodes the subject data, and generates a subject signal to include the subject data. The subject data transmitted from the slave 3 is also referred to as a transmission data (TxDATA) of the slave 3, and the subject signal transmitted from the slave 3 is also referred to as a transmission signal (TxSIG) of the slave 3. The clock extraction circuit 3c outputs, to the transmission circuit 3e, the clock signal that is extracted from the received signal of the slave 3 and is synchronized with the received signal of the slave 3. Then, the transmission circuit 3e transmits, to the master 2, the subject signal including the encoded subject data via the wire harness 4 in synchronization with the clock signal provided by the clock extraction circuit 3c.

The transmission circuit 3e of the salve 3 transmits the subject signal to the master 2 during a slave transmission period (STP). As shown in FIG. 1, the clock extraction circuit 3c performs the clock data recovery to the received signal of the slave 3 by detecting an edge of an eye pattern of the received signal of the slave 3. A period during which the clock data recovery being performed, that is, a period during which the detection of the eye pattern edge being performed, is referred to as an eye pattern edge detection period. The eye pattern edge detection period is also referred to as an edge detection period (EDP) or clock extraction period. When the controller 3a of the slave receives the subject signal transmitted from the master 2, the controller 3a extracts the subject data from the subject signal, and determines whether the subject data is equal to "0" or "1" at a data determination time point. The data determination time point in the slave 3 is also referred to as a data receiving point (DRP). A time period during which the subject signal to be received by the slave 3 exists on the wire harness 4 is referred to as a signal existing period. The slave transmission period is set to not interfere the eye pattern edge detection period and the data receiving point within the signal existing period. That is, the slave transmission period is set to exclude the eye pattern edge detection period and the data receiving point within the signal existing period.

In the master 2, the receiving circuit 2c receives the subject signal transmitted from the transmission circuit 3e of the slave 3 via the wire harness 4. The subject signal received by the master 2 is also referred to as a received signal (RxSIG) of the master 2, and the subject data included in the subject signal received by the master 2 is also referred to as a received data (RxDATA) of the master 2. When the receiving circuit 2c of the master 2 receives the subject signal from the slave 3, the receiving circuit 2c decodes the subject signal, and outputs, to the analog-digital converting circuit 2d, the subject signal that is decoded by the receiving circuit 2c. When the analog-digital converting circuit 2d receives the subject signal from the receiving circuit 2c, the analog-digital converting circuit 2d performs an analog-to-digital conversion to the subject signal, and outputs the converted subject signal to the DSP 2e. When the DSP 2e receives the subject signal from the analog-digital converting circuit 2d, the DSP 2e performs an echo cancellation to the subject signal in order to remove an echo component from the subject signal. Specifically, the DSP 2e cancels a waveform component of the transmission signal of the master 2 as the echo component from a waveform of the received signal of the master 2. Then, the DSP 2e outputs, to the controller 2a and the clock extraction circuit 2f, the subject signal from which the echo component is canceled.

When the controller 2a of the master 2 receives the subject signal from the DSP 2e, the controller 2a extracts the subject data included in the subject signal, and determines whether the subject data is equal to "0" or "1". That is, the controller 2a of the master 2 reproduces the subject data transmitted from the slave 3. When the clock extraction circuit 2f of the master 2 receives the subject signal from the DSP 2e, the clock extraction circuit 2f extracts, from the subject signal, a clock signal that is synchronized with the subject signal by performing the clock data recovery. That is, the clock extraction circuit 2f extracts, from the received signal of the master 2, the clock signal that is synchronized with the received signal of the master 2. Then, the clock extraction circuit 2f outputs, to the receiving circuit 2c and the analog-digital converting circuit 2d, the extracted clock signal that is synchronized with the received signal of the master 2. The receiving circuit 2c of the master 2 receives the subject signal transmitted from the slave 3 based on the clock signal output from the clock extraction circuit 2f. The analog-digital converting circuit 2d performs the analog-to-digital conversion of the subject signal based on the clock signal output from the clock extraction circuit 2f so that the analog-to-digital conversion is in synchronization with the clock signal included in the received signal of the master 2.

Hereinafter, the subject signal transmitted from the master 2 and received by the slave 3 is referred to as a first subject signal, the subject signal transmitted from the slave 3 and received by the master 2 is referred to as a second subject signal, the subject data included in the first subject signal is referred to as a first subject data, and the subject data included in the second subject data is referred to as a second subject data. The first subject signal corresponds to the transmission signal of the master 2 and the received signal of the slave 3, the second subject signal corresponds to the transmission signal of the slave 3 and the received signal of the master 2, the first subject data corresponds to the transmission data of the master 2 and the received data of the slave 3, and the second subject data corresponds to the transmission data of the slave 3 and the received data of the master 2.

Figure 2:
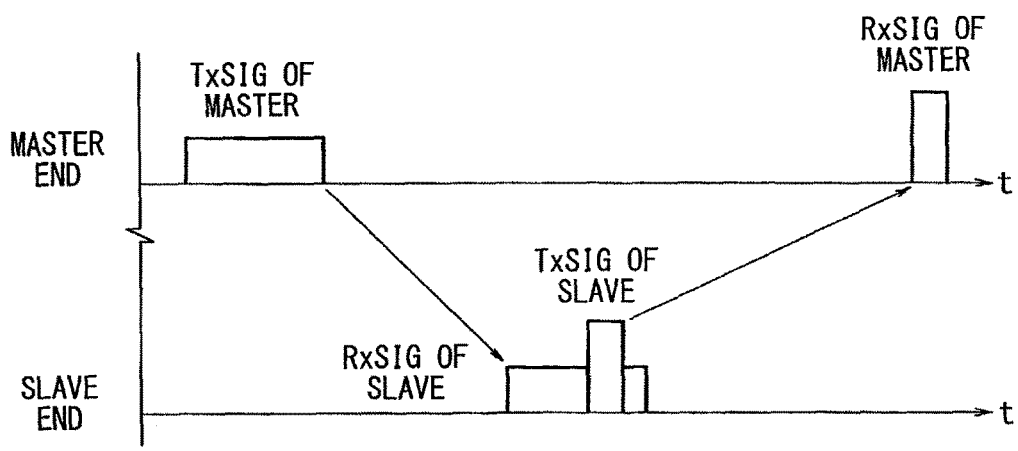
FIG. 2 is a diagram showing a delay in a subject signal transmitted from a master and a delay in a subject signal transmitted from a slave.

As described above, when the slave 3 receives the first subject signal, which is transmitted from the master 2, via the wire harness 4, the slave 3 performs the clock data recovery to the first subject signal and determines the first subject data included in the first subject signal. At the same time, the slave 3 transmits the second subject signal to the master 2 so that the clock data recovery performed to the first subject signal and the determination of the first subject data included in the first subject signal is not affected by the transmission of the second subject signal. In this case, the slave 3 is able to accurately control a transmission time point of the second subject signal by synchronizing the transmission time point of the second subject signal with the multiplied clock signal detected by the clock data recovery. As shown in FIG. 2, a signal phase of the first subject signal and a signal phase of the second subject signal change corresponding to a cable length of the wire harness 4. That is, a communication delay time changes corresponding to the cable length of the wire harness 4. Thus, the analog-digital converting circuit 2d and the DSP 2e are required to be included in the master 2. When the master 2 is equipped to an ECU, an adding of the analog-digital converting circuit 2d and the DSP 2e can be easily achieved.

Figure 3:
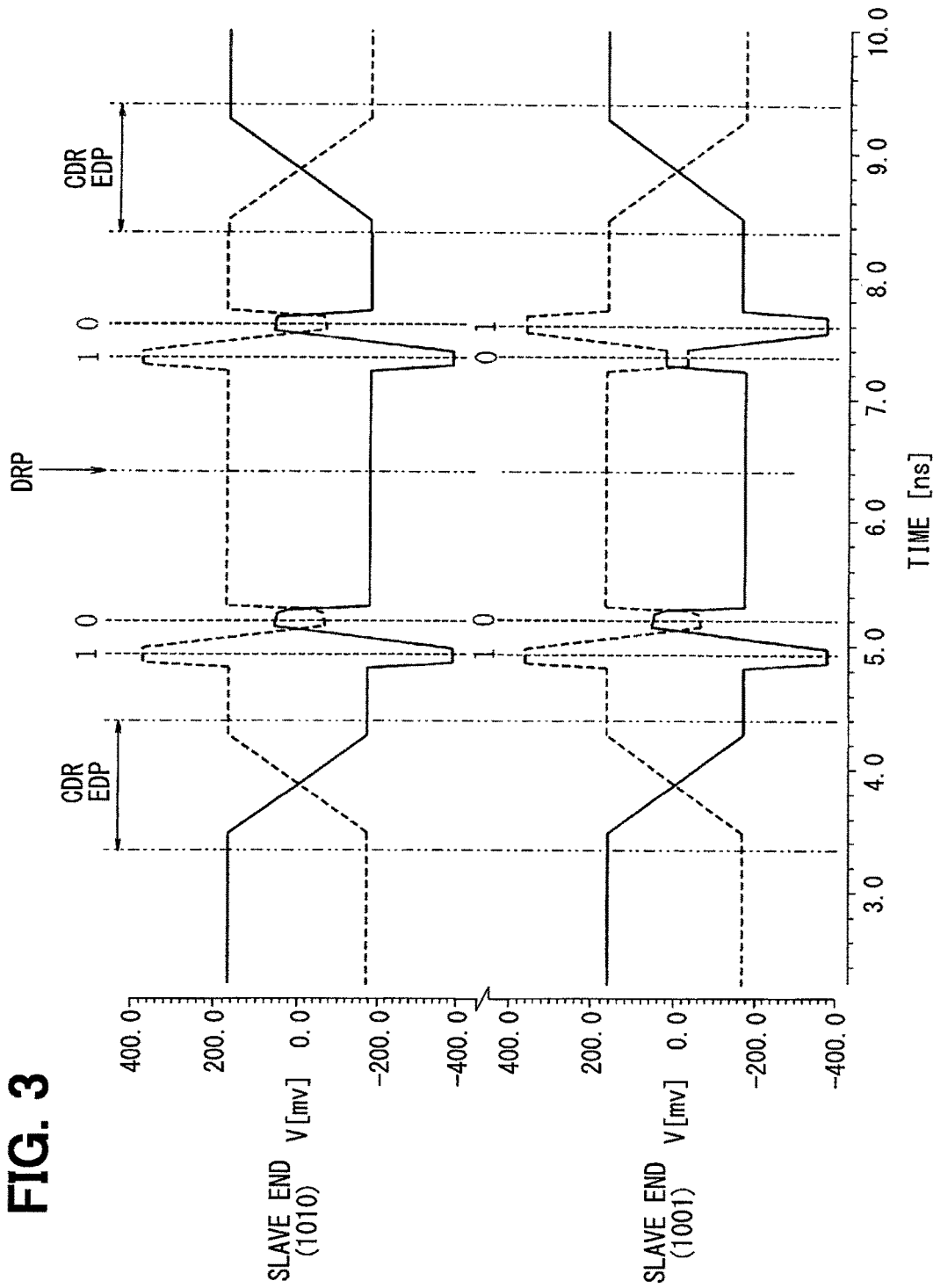
FIG. 3 is a diagram showing simulated waveforms of subject signals on a bus at slave end.

The slave 3 sets a middle point of two adjacent (consecutive) edge detection periods as the data receiving point. Thus, with respect to one bit of the transmission data of the master 2, two or more bits of the transmission data of the slave 3 can be transmitted. Thus, a transmission rate of the transmission data of the slave 3 can be set higher than a transmission rate of the transmission data of the master 2. FIG. 3 shows slave end signal waveforms. The slave end signal waveform is a simulated waveform of the signal on the wire harness 4 adjacent to the slave 3. In the slave end signal waveform, a waveform component of the transmission signal of the slave 3 and a waveform component of the received signal of the slave 3 are overlapped. In FIG. 3, binary data is transmitted and received in a non-return-to-zero (NRZ) code. FIG. 3 shows a first example in which the slave 3 transmits, to the master 2, four bits of transmission data "1", "0", "1", "0" between the two adjacent edge detection periods. FIG. 3 also shows a second example in which the slave 3 transmits, to the master 2, four bits of transmission data "1", "0", "0", "1" between the two adjacent edge detection periods.

Figure 4:
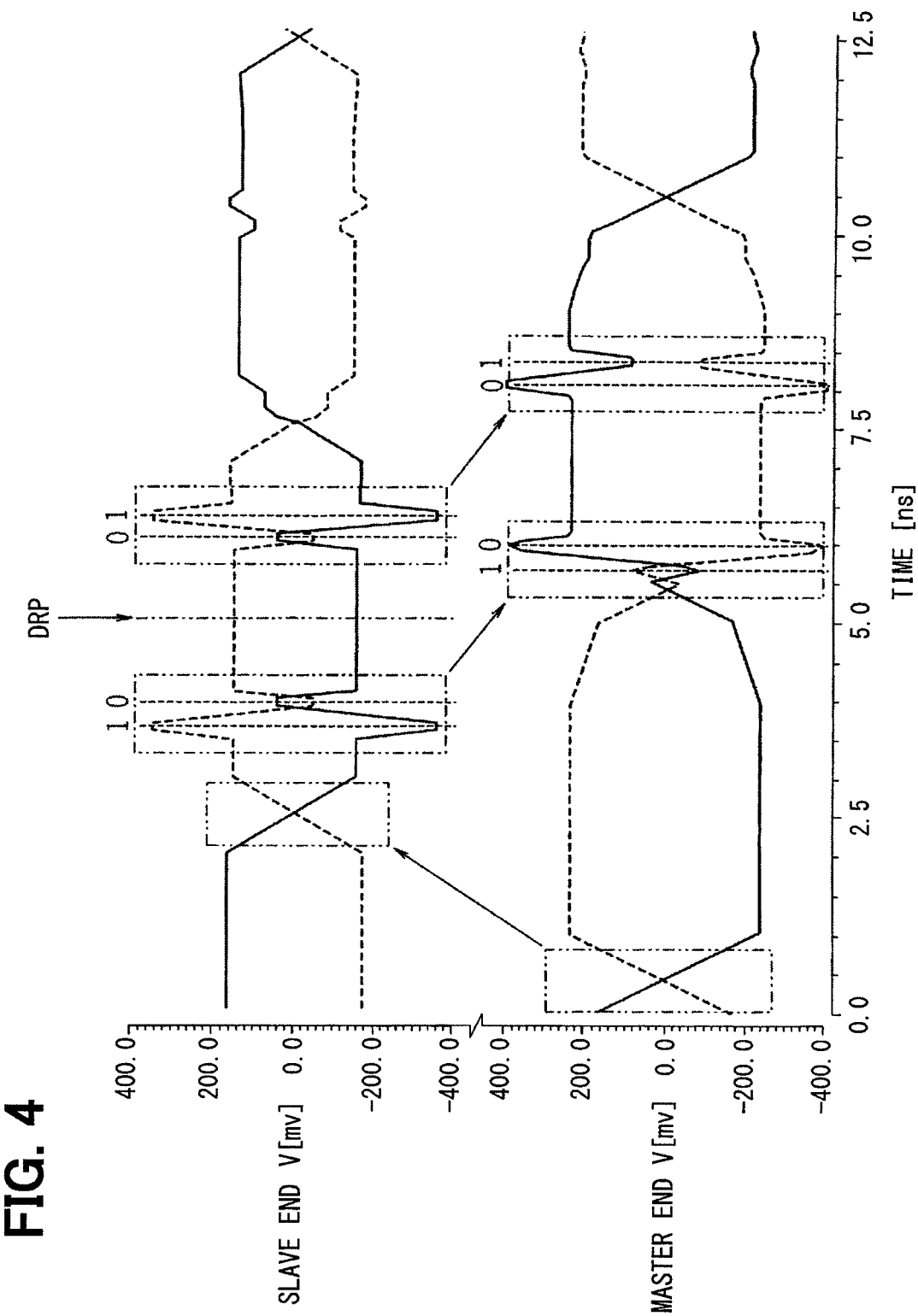
FIG. 4 is a diagram showing a simulated waveform of a subject signal on a bus at slave end and a simulated waveform of a subject signal on the bus at master end.

FIG. 4 shows a slave end signal waveform and a master end signal waveform. The master end signal waveform is a simulated waveform of the signal on the wire harness 4 adjacent to the master 2. In the master end signal waveform, a waveform component of the transmission signal of the master 2 and a waveform component of the received signal of the master 2 are overlapped. FIG. 4 shows an example in which the slave 3 transmits, to the master 2, four bits of transmission data "1", "0", "0", "1" between the two adjacent edge detection periods. In the slave end signal waveform, although the waveform of the transmission signal of the slave 3 is combined with the waveform of the received signal of the slave 3, the clock data recovery and the determination of the received data included in the received signal of the slave 3 can be performed properly. In the master end signal waveform, since the waveform of the transmission signal of the master 2 is combined with the waveform of the received signal of the master 2, the waveform of the transmission signal of the master 2 needs to be removed (canceled) from the waveform of the received signal of the master 2 in order to reproduce the subject data transmitted from the slave 3 to the master 2.

As described above, in the present embodiment, when the slave 3 receives, via the wire harness 4, the transmission signal of the master 2 as the received signal of the slave 3, the slave 3 extracts the clock signal from the received signal of the slave 3 (clock extraction processing), and determines the received data included in the received signal of the slave 3 (data determination processing). At the same time, the slave 3 transmits the transmission signal of the slave 3 to the master 2 within the signal existing period of the received signal of the slave 3 so that the clock extraction processing and the data determination processing are not interfered by the transmission signal of the slave 3. When the master 2 receives the signal transmitted from the slave 3 as the received signal of the maser 2, the master 2 removes the waveform of the transmission signal of the master 2 from the waveform of the received signal of the master 2. Then, the master 2 performs the data determination processing. With above-described configuration, duplex data communication using single wire harness 4 between the master 2 and the slave 3 can be performed with a simplified circuit structure at a low cost. That is, additional circuits, such as a modulation and demodulation circuit, an analog-digital converting circuit, and a digital-analog converting circuit are not necessary in the slave 3. Thus, the slave 3 of the data communication system 1 according to the present embodiment can restrict an increase in cost.

Second Embodiment

Figure 5:
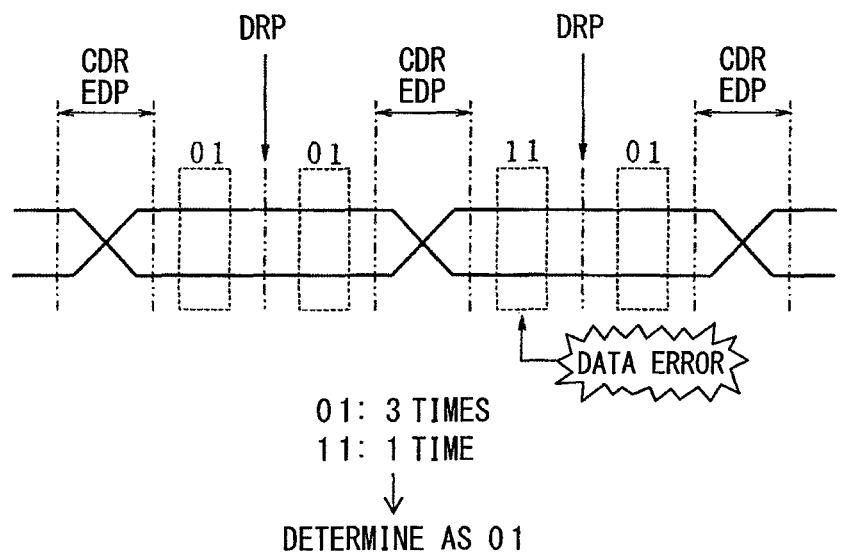
FIG. 5 is a diagram showing a subject data transmitted from a slave according to a second embodiment of the present disclosure.
Figure 6:
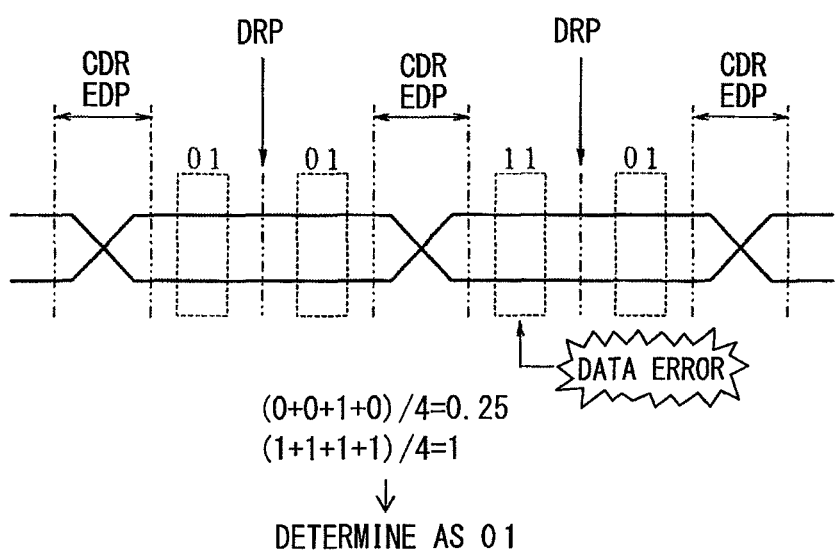
FIG. 6 is a diagram showing a subject data transmitted from the slave.

The following will describe a data communication system according to a second embodiment of the present disclosure with reference to FIG. 5 and FIG. 6.

The following will mainly describe different configurations and different operations of the data communication system according to the present embodiment compared with the data communication system according to the first embodiment.

In the present embodiment, the slave 3 imposes the same subject data on the subject signal by multiple times, and transmits the same subject data to the master 2 by multiple times. When the master 2 receives the same subject data transmitted from the slave 3 by multiple times, the master 2 determines the subject data based on a majority rule or based on an average value of the subject data.

Suppose that the slave 3 is configured to transmit, to the master 2, the same subject data by four times. Thus, when the slave 3 transmits, to the master 2, two bit data "0", "1" by four times, the master 2 determines the received data as "0", "1" when no error is occurred in the data transmission. For example, as shown in FIG. 5, when a data error occurs in a third transmission and the master 2 mistakenly determines the two bit data "0", "1" transmitted from the slave 3 as "1", "1", the master 2 determines the received data based on the majority rule. Specifically, the master 2 receives three times of two bit data "0", "1" and receives one time of two bit data "1", "1". Since three times is more than one time, the master 2 determines the received data as "0", "1". For example, as shown in FIG. 6, when a data error occurs in a third transmission and the master 2 mistakenly determines the two bit data "0", "1" transmitted from the slave 3 as "1", "1", the master 2 determines the received data based on an average value of the received data. Specifically, the master 2 calculates an average value with respect to the two bit data received by four times, and obtains the average value of "0.25", "1". Then, the master 2 determines the received data as "0", "1" based on the average value of "0.25", "1". As described above, in a case where the slave 3 imposes the same subject data on the subject signal by multiple times, and transmits the same subject data to the master 2 by multiple times, the master 2 may perform the data determination processing based on the majority rule or based on the average value of the subject data. Thus, even when a data transmission error occurs to the subject data transmitted from the slave 3, the master 2 is able to accurately reproduce the subject data transmitted from the slave 3. Accordingly, a reliability of data transmission is improved.

Third Embodiment

Figure 7:
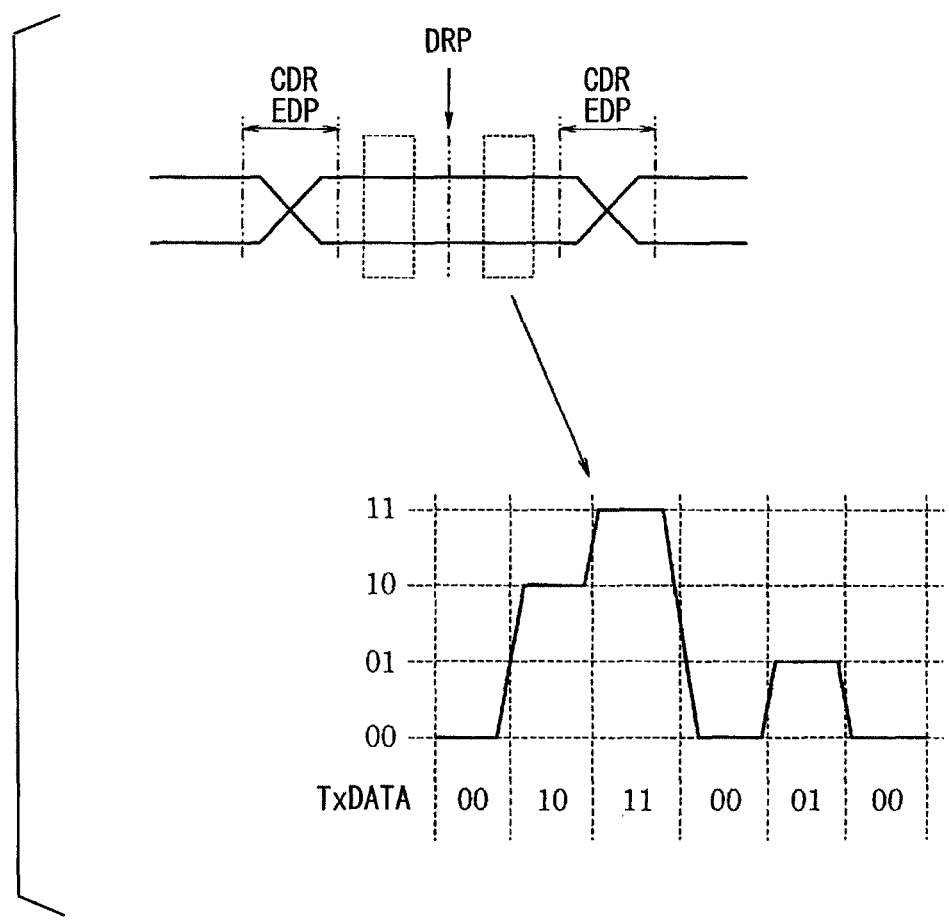
FIG. 7 is a diagram showing an amplitude of a subject signal transmitted from a slave and a subject data of the subject signal according to a third embodiment of the present disclosure.

The following will describe a data communication system according to a third embodiment of the present disclosure with reference to FIG. 7. The following will mainly describe different configurations and different operations of the data communication system according to the present embodiment compared with the data communication system according to the first embodiment.

In the present embodiment, the slave 3 transmits, to the master 2, a multi-valued data as the transmission data of the slave 3. Specifically, as shown in FIG. 5, the slave 3 sets four amplitude gradations with respect to the transmission data of the slave 3. Then, the slave 3 transmits the multi-valued transmission data from the slave 3 to the master 2. With this configuration, the slave 3 can increase a transmission rate of the transmission data by setting three or more amplitude gradations with respect to the transmission data.

Fourth Embodiment

Figure 8:
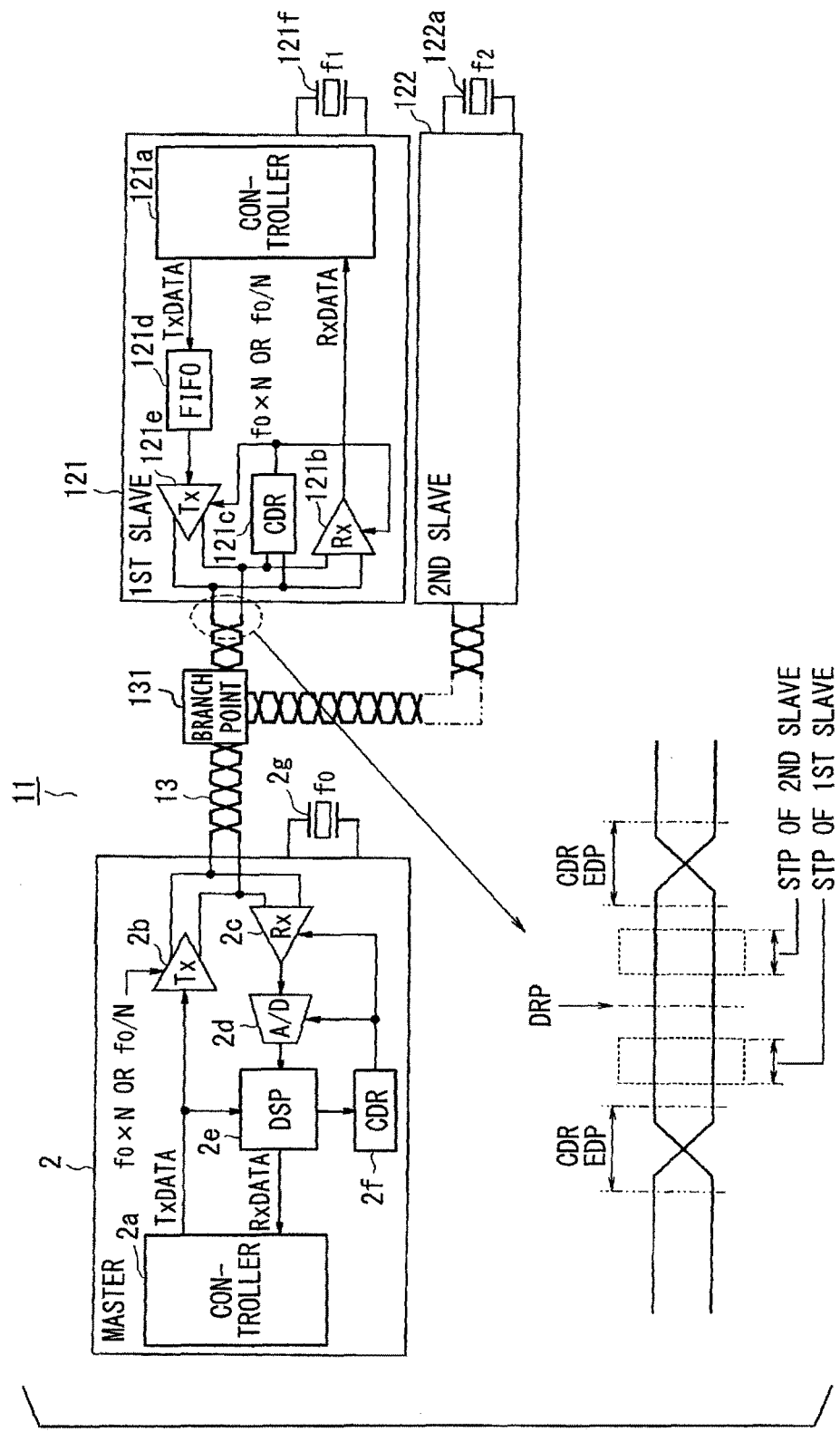
FIG. 8 is a diagram showing a configuration of a data communication system according to a fourth embodiment of the present disclosure.
Figure 9:
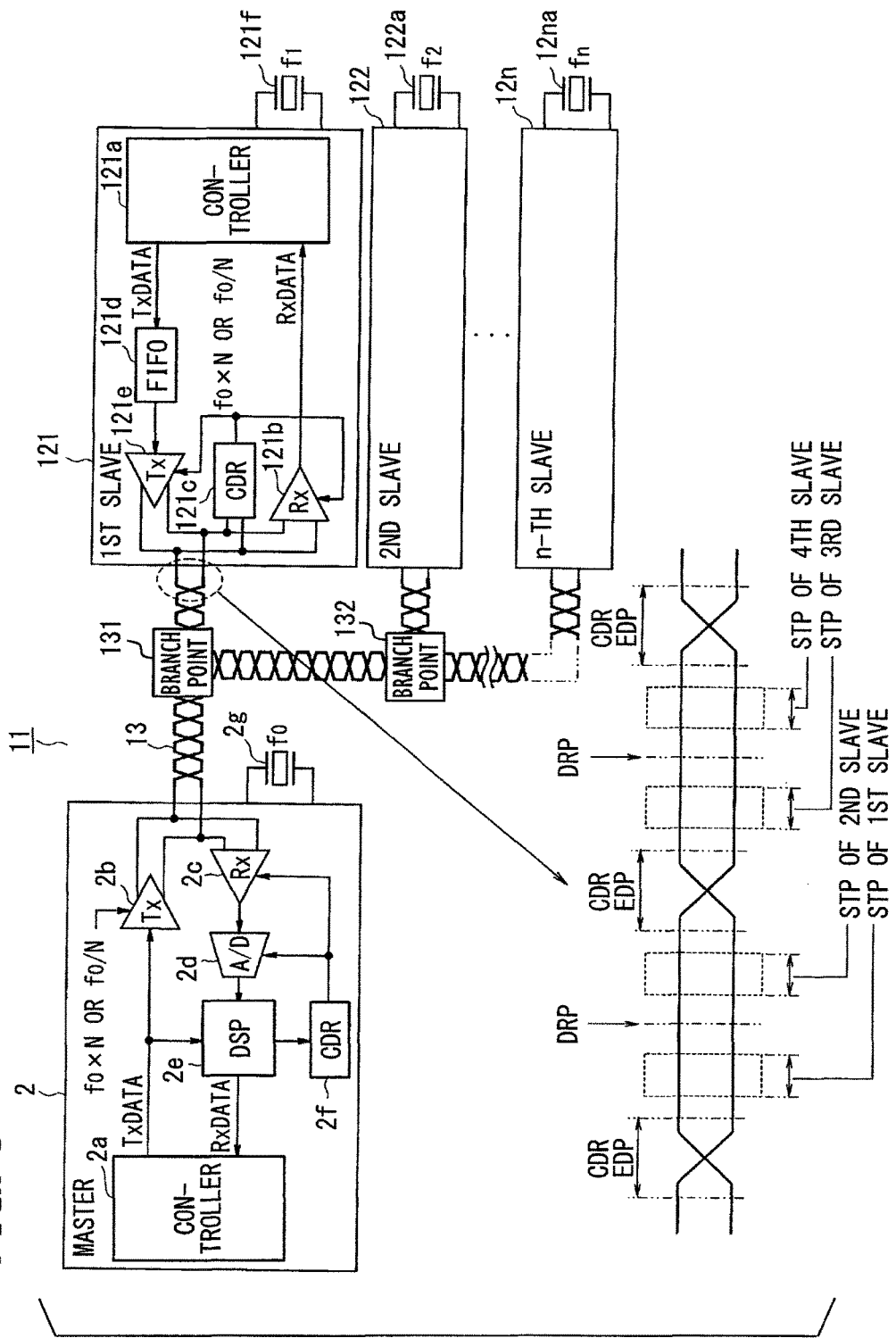
FIG. 9 is a diagram showing a configuration of a data communication system according to the fourth embodiment.
Figure 10:
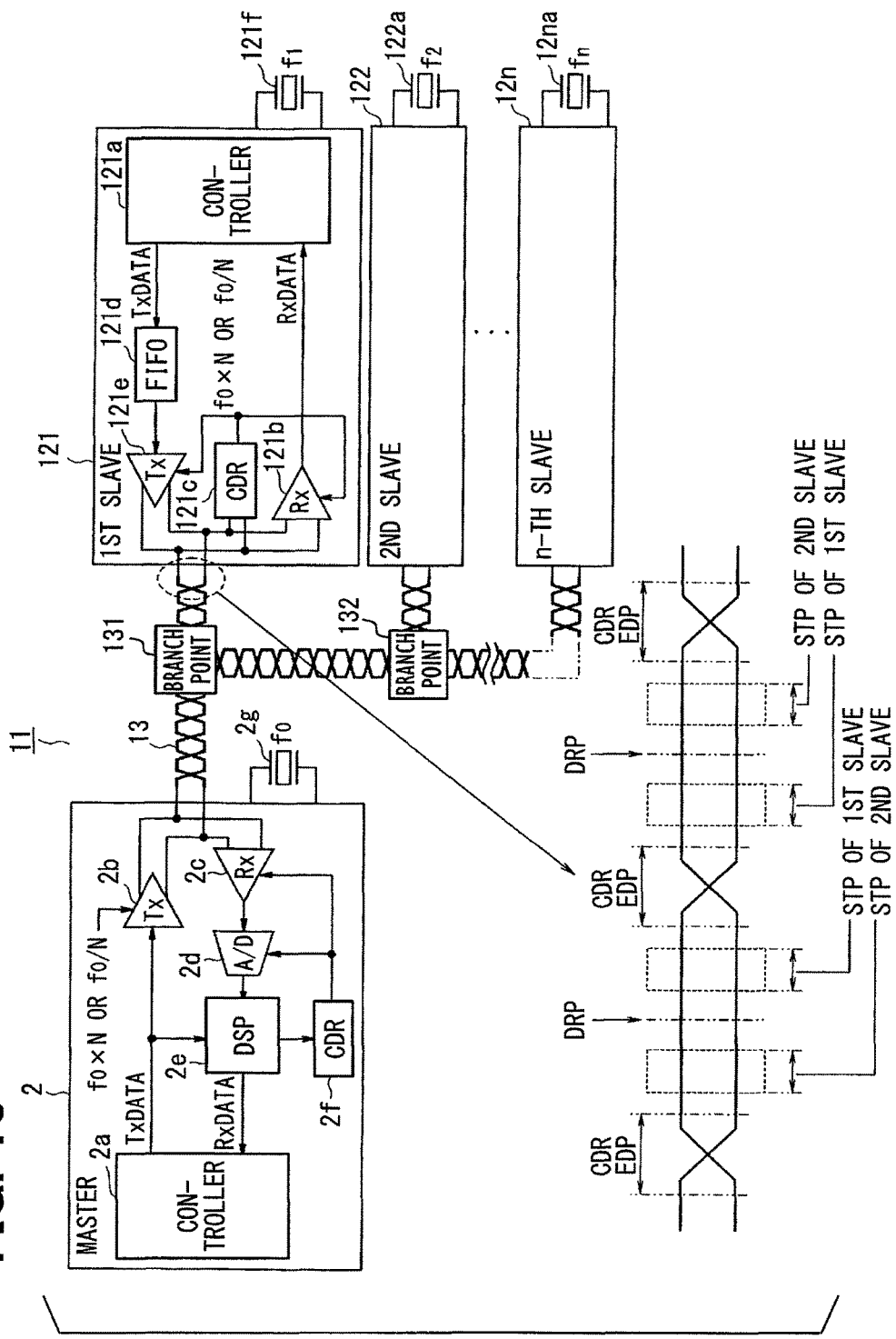
FIG. 10 is a diagram showing an assignment of a transmission period to each slave in the data communication system according to the fourth embodiment.

The following will describe a communication system according to a fourth embodiment of the present disclosure with reference to FIG. 8 to FIG. 10. The following will mainly describe different configurations and different operations of the data communication system according to the present embodiment compared with the data communication system according to the first embodiment to the third embodiment.

In the first embodiment to the third embodiment, the master 2 is connected with the slave 3 via the wire harness 4 in point-to-point relation. In the present embodiment, the master 2 is connected with multiple slaves via the wire harness in one-to-many relation. Herein, many may be set to an integer n that is equal to or greater than two. Specifically, as shown in FIG. 8, in the data communication system 11 according to the present embodiment, the master 2 is connected with a first slave 121 to an n-th slave 12n via a wire harness 13 in one-to-many relation. Each of the first slave 121 to the n-th slave 12n has a configuration similar to the configuration of the slave 3 described in the foregoing embodiments. For example, the first slave 121 includes a controller 121a, a receiving circuit 121b, a clock extraction circuit 121c, a FIFO 121d, and a transmission circuit 121e. The first slave 121 is connected with an external oscillator 121f. Similarly, as shown in FIG. 8 to FIG. 10, the second slave 122 is connected with an external oscillator 122a having an oscillation frequency f2, and the n-th slave 12n is connected with an external oscillator 12na having an oscillation frequency fn. The wire harness 13 includes a first branch point 131 to m-th branch point 13m. Herein, m satisfies an expression m=n−1.

In the above-described configuration, a time period between the adjacent two edge detection periods is assigned to the first slave 121 to the n-th slave 12n in a time division manner as the slave transmission periods. Specifically, as shown in FIG. 8, in a configuration where the master 2 is connected with the first slave 121 and the second slave 122 in one-to-two relation (n=2), one of the two slave transmission periods is assigned to the first slave 121 and the other one of the two slave transmission periods is assigned to the second slave 122.

The slave transmission periods for the multiple slaves 121 to 12n can be uniformly divided. Alternatively, the slave transmission periods for the multiple slaves 121 to 12n can be non-uniformly divided. For example, as shown in FIG. 9, when the first slave 121 to the n-th slave 12n are in equal relation, the slave transmission periods for the first slave 121 to the n-th slave 12n are uniformly divided. For another example, as shown in FIG. 10, when the first slave 121 to the n-th slave 12n are not in equal relation, the slave transmission periods for the first slave 121 to the n-th slave 12n are non-uniformly divided. FIG. 10 shows a case in which the transmission data of the first slave 121 is transmitted in preference to the transmission data of other slaves, which are the second slave 122 to the n-th slave 12n. That is, the first slave 121 has a higher priority than other slaves 122 to 12n. For example, when the first slave 121 transmits the transmission data, which has a higher importance or has a greater size compared with other transmission data of other slaves 122 to 12n, the first slave 121 can be configured to transmit the transmission data in preference to other slaves 122 to 12n. In this case, the first slave 121 may be configured to have a higher transmission rate compared with transmission rates of other slaves 122 to 12n. The first slave 121 may be configured to transmit the same transmission data by multiple times during the slave transmission periods assigned to the first slave 121. The first slave 121 may also be configured to transmit different transmission data in each slave transmission period assigned to the first slave 121.

In the present embodiment, even when the master 2 is connected with the first slave 121 to the n-th slave 12n in one-to-many relation, the duplex data communication using single wire harness 13 between the master 2 and the multiple slaves 121 to 12n can be performed with a simplified circuit structure. That is, additional circuits, such as a modulation and demodulation circuit, an analog-digital converting circuit, and a digital-analog converting circuit are not necessary in each of the multiple slaves 121 to 12n. Thus, the slaves 121 to 12n of the data communication system 11 according to the present embodiment can restrict an increase in cost.

Fifth Embodiment

Figure 11:
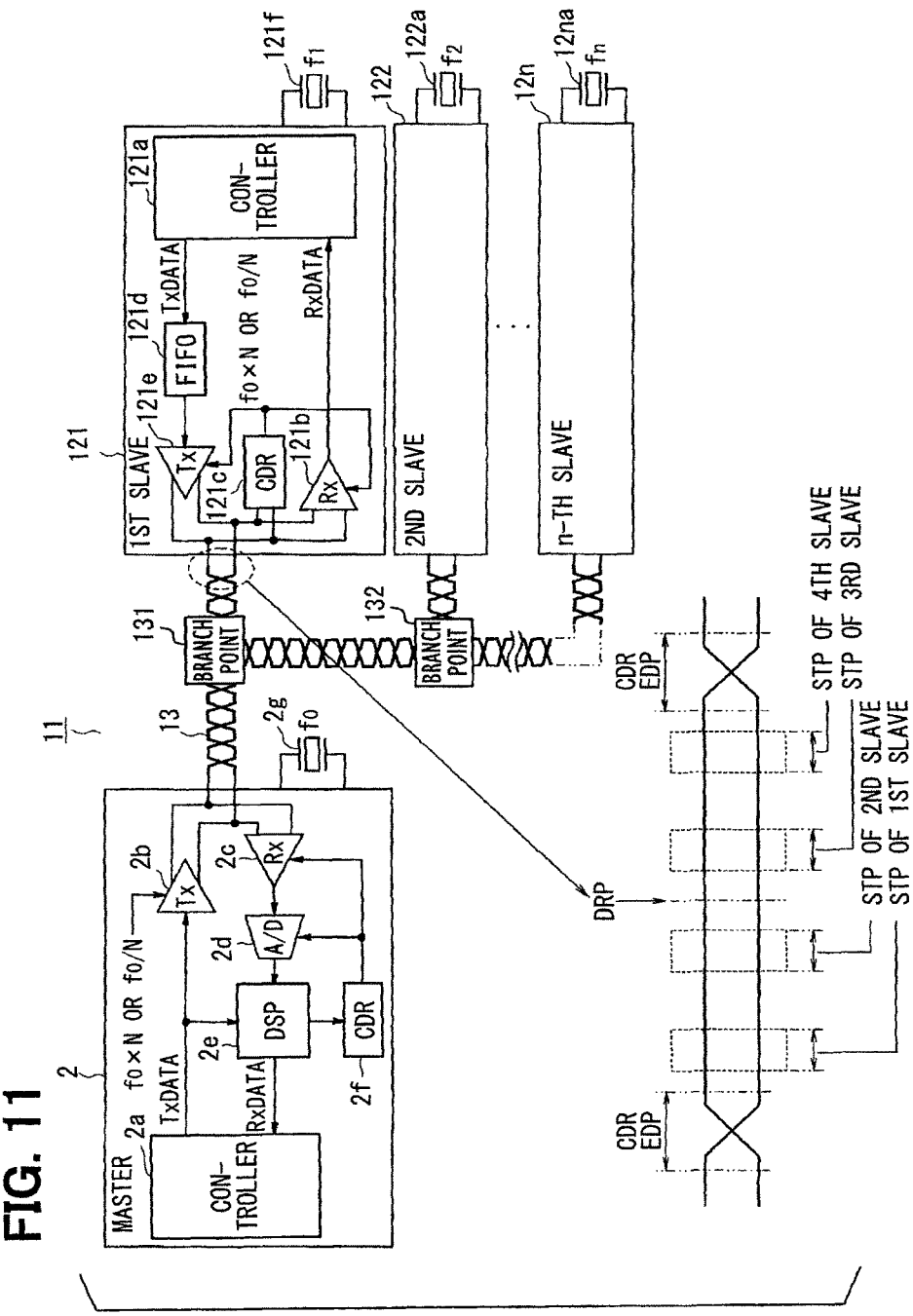
FIG. 11 is a diagram showing an assignment of a transmission period to each slave in the data communication system according to the fourth embodiment.

The following will describe a data communication system according to a fifth embodiment of the present disclosure with reference to FIG. 11 and FIG. 12. The following will mainly describe different configurations and different operations of the data communication system according to the present embodiment compared with the data communication system according to the first embodiment to the fourth embodiment.

In the foregoing embodiments, two slave transmission periods are defined between the two adjacent edge detection periods. As shown in FIG. 11, in the present embodiment, four slave transmission periods are defined between the two adjacent edge detection periods. In this case, a length of each slave transmission period between the two adjacent edge detection periods depends on a transmission rate of the transmission data of the master 2. For example, when the transmission rate of the transmission data of the master 2 increases, the length of each slave transmission period between the two adjacent edge detection periods becomes shorter, and accordingly, the transmission rate of the transmission data of the slave 3 becomes lower. For another example, when the transmission rate of the transmission data of the master 2 decreases, the length of each slave transmission period between the two adjacent edge detection periods becomes longer, and accordingly, the transmission rate of the transmission data of the slave 3 becomes higher.

In the present embodiment, the slave transmission periods for the multiple slaves 121 to 12n can be uniformly divided. Alternatively, the slave transmission periods for the multiple slaves 121 to 12n can be non-uniformly divided. As shown in FIG. 11, when the first slave 121 to the n-th slave 12n are in equal relation, the slave transmission periods for the first slave 121 to the n-th slave 12n are uniformly divided. As shown in FIG. 12, when the first slave 121 to the n-th slave 12n are not in equal relation, the slave transmission periods for the first slave 121 to the n-th slave 12n are non-uniformly divided.

Other Embodiments

The first embodiment to the fifth embodiment can be combined with each other within the scope of the present disclosure.

For example, the third embodiment can be combined with the fourth embodiment or the fifth embodiment so that multi-valued data is transmitted from the slave to the master in a configuration where the master is connected with multiple slaves in one-to-many relation.

In the foregoing embodiments, the wire harness is described as an example of the single transmission line used in the duplex data communication. As another example, the single transmission line used in the duplex data communication may be provided by two paired wires that perform a differential signaling.

In the foregoing embodiments, the transmission line is provided by the wire harness as an example. For another example, the transmission line may be provided by a different transmission medium.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A data communication system comprising:
a master transmitting a first subject signal including a first subject data via a transmission line; and
a slave receiving the first subject signal transmitted from the master via the transmission line, the slave extracting a clock signal from the first subject signal by performing a clock data recovery process and determining the first subject data based on the first subject signal,
wherein the slave transmits, to the master, a second subject signal including a second subject data via the transmission line during an existing period of the first subject signal, the slave transmits the second subject signal to the master without interfering with an extracting of the clock signal and a determination of the first subject data, and
wherein the master receives the second subject signal transmitted from the slave via the transmission line and cancels a waveform component of the first subject signal from a waveform of the second subject signal, and then determines the second subject data based on the second subject signal.

2. The data communication system according to claim 1, wherein the master transmits the first subject signal to the slave at a first transmission rate and the slave transmits the second subject signal to the master at a second transmission rate, and
wherein the second transmission rate is higher than the first transmission rate.

3. The data communication system according to claim 1, wherein the master transmits the first subject signal to the slave at a first transmission rate and the slave transmits the second subject signal to the master at a second transmission rate, and
wherein the second transmission rate is lower than the first transmission rate.

4. The data communication system according to claim 3, wherein the slave imposes the second subject data on the second subject signal by two or more times, and transmits the second subject signal to the master so that the second subject data is received by the master by two or more times.

5. The data communication system according to claim 4, wherein the master determines the second subject data transmitted from the slave based on a majority rule of a quantity of times by which the second subject data is received by the master.

6. The data communication system according to claim 4, wherein the master determines the second subject data transmitted from the slave based on an average value of two or more subject data that are received by the master by two or more times.

7. The data communication system according to claim 1, wherein the slave transmits a multi-valued data as the second subject data to the master.

8. The data communication system according to claim 1, wherein the master is connected with a plurality of the slaves in one-to-many relation, and wherein a transmission period for transmitting the second subject signal to the master is assigned to each of the slaves in time division manner.

9. The data communication system according to claim 8, wherein each of the slaves transmits the second subject signal to the master at a transmission rate different from one another.

10. The data communication system according to claim 1, wherein
the slave transmits the second subject signal to the master during a slave transmission period during the existing period of the first subject signal,
the slave extracts the clock signal from the first subject signal during an edge detection period during the existing period of the first subject signal,
the slave determines the first subject data at a data receiving point during the existing period of the first subject signal, and
the slave transmission period, the edge detection period, and the data receiving point are mutually exclusive times.

11. A slave, which configures a data communication system together with a master that transmits a first subject signal including a first subject data to the slave via a transmission line, the slave comprising:
a receiving circuit receiving, from the master, the first subject signal via the transmission line;
a clock extraction circuit extracting a clock signal from the first subject signal by performing a clock data recovery process;
a data determination unit determining the first subject data based on the first subject signal; and
a transmission circuit transmitting a second subject signal including a second subject data to the master via the transmission line during an existing period of the first subject signal, the slave transmitting the second subject signal to the master without interfering with an extracting of the clock signal and a determination of the first subject data.

12. The slave according to claim 11, wherein
a transmission circuit transmits the second subject signal to the master during a slave transmission period during the existing period of the first subject signal,
the clock extraction circuit extracts the clock signal from the first subject signal during an edge detection period during the existing period of the first subject signal,
the data determination unit determines the first subject data at a data receiving point during the existing period of the first subject signal, and
the slave transmission period, the edge detection period, and the data receiving point are mutually exclusive times.

* * * * *